Apr. 24, 1923.
J. L. HUSTON
TIRE LOCK
Filed Oct. 18, 1921
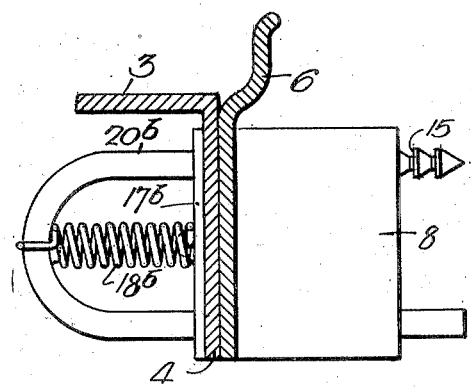
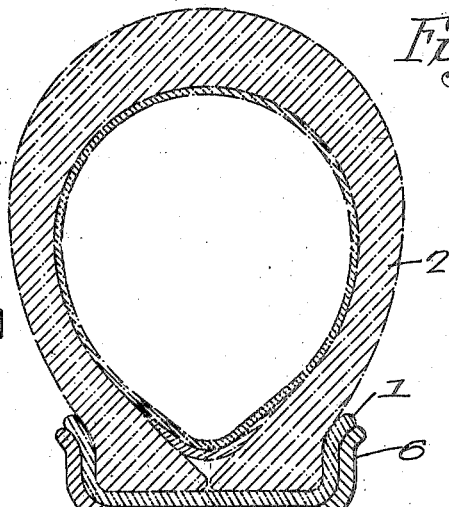
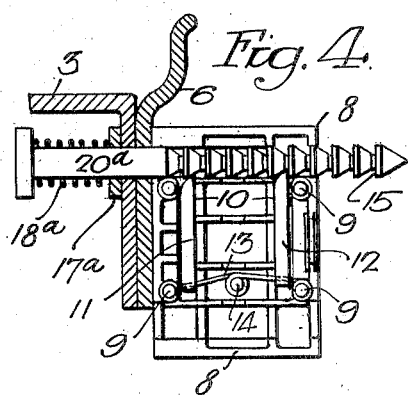
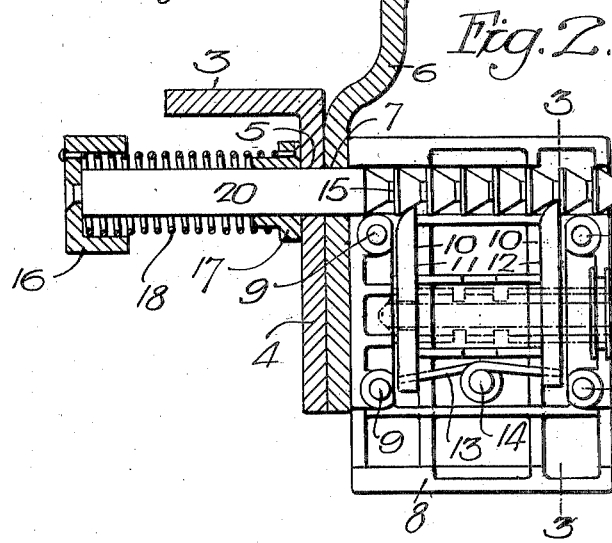
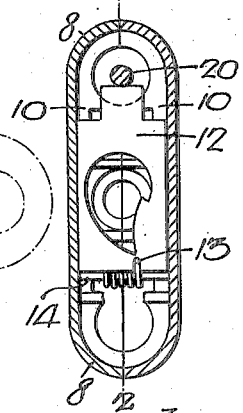
Inventor.
John L. Huston.
by his Attorneys.

Patented Apr. 24, 1923.

1,453,139

UNITED STATES PATENT OFFICE.

JOHN L. HUSTON, OF BOSTON, MASSACHUSETTS, ASSIGNOR TO THE MILLER LOCK COMPANY, OF PHILADELPHIA, PENNSYLVANIA, A CORPORATION OF PENNSYLVANIA.

TIRE LOCK.

Application filed October 18, 1921. Serial No. 508,485.

*To all whom it may concern:*

Be it known that I, JOHN L. HUSTON, a citizen of the United States, residing in Boston, Massachusetts, have invented certain Improvements in Tire Locks, of which the following is a specification.

My invention relates to certain improvements in locks for securing spare automobile tires to the carrying frame mounted on an automobile.

One object of my invention is to provide a simple and effective lock for this purpose, which will not rattle and which will hold the parts firmly in position.

A further object of the invention is to construct the lock so that by the use of two bolts acting upon one shackle, a fine adjustment of the shackle can be made in order to insure the proper securing of the parts of the tire holder.

These objects I attain in the following manner, reference being had to the accompanying drawings, in which:

Fig. 1 is a sectional view of a spare tire holder showing my improved lock securing the parts together;

Fig. 2 is an enlarged sectional view of the lock on the line 2—2, Fig. 3;

Fig. 3 is a sectional view on the line 3—3, Fig. 2;

Fig. 4 is a view showing my improved locking device in its simplest form; and

Fig. 5 is a view of a modification, in which a U-shaped shackle is used.

Referring in the first instance to Fig. 1, 1 is a rim and 2 is a tire mounted on the rim. The tire and the rim are shown by dotted lines. 3 is one form of tire holder, which may consist of a complete ring or may be a segment of a ring. This tire holder has an extension 4 perforated at 5 for the passage of the shackle of the lock. 6 is a retaining band conforming to the holder 3 and perforated at 7 for the passage of the shackle. When the rim of a tire is mounted on the holder 3 and the retainer 6 is locked in position, it is impossible to remove the tire from the holder without breaking some of the parts.

Locks, as heretofore constructed for securing these parts together, have rattled to such an extent as to be rendered objectionable. One of the main objects of my invention is to obviate the rattling of the lock when secured to the holder.

8 is the body of the lock made, in the present instance, of two parts, as shown in Fig. 3, the parts being secured together by rivets 9, or other fastenings. In the lock are ways 10 for the bolts 11 and 12. These bolts have beveled ends, which are arranged to engage the shackle 20, being projected towards the shackle by a spring 13 mounted on a post 14. The shackle, in the present instance, has a series of annular grooves forming shoulders 15 spaced a given distance apart. The bolts are so placed in the lock casing that when one bolt is in engagement with the shoulder of the shackle, the other bolt is midway between two shoulders, as clearly illustrated in Fig. 2, so that a fine adjustment can be made and yet the shackle will have sufficient strength to resist any ordinary pressure in an endeavor to pry open the lock.

Secured to the outer end of the shackle 20 is a cup-shaped head 16 and between this head and a sleeve 17, on the shackle, is a spring 18, which is secured to the head and to the sleeve. This spring tends to force the sleeve firmly against the portion 4 of the holder, the spring yielding as the shackle is forced through the holder and into the lock, until the pressure is such that the shackle firmly holds the parts together without rattling.

To remove the lock, all that is necessary is to withdraw the bolts by turning a key, shown by dotted lines in Fig. 2, and withdrawing the shackle. As the spring and its sleeve are attached to the shackle, the parts will not become misplaced. In some instances, the spring and the sleeve may be separated from the shackle, as illustrated in Fig. 4, $18^a$ being the spring $17^a$ the washer.

In Fig. 5, a double shackle $20^b$ is illustrated, in which one leg is plain and the other leg has a series of shoulders which are engaged by the bolts of the lock. A plate $17^b$ takes the place of the sleeve 17 and extends the full width of the lock and has an opening for both legs of the shackle. A spring $18^b$ is secured to the shackle and to the plate, accomplishing the same purpose as the spring illustrated in Fig. 2.

I claim:

1. The combination of a lock casing adapted to be located on one side of a two part tire holder; a shouldered shackle extending through openings in the parts of the tire holder; a bolt in the casing arranged to engage one of the shoulders of the shackle; and a spring tending to clamp the two parts of the tire holder to the casing of the lock, preventing rattling of the lock.

2. The combination in a tire lock, of a casing; two bolts in the casing; a shackle having a series of shoulders thereon, the bolts being so spaced that when one bolt is in engagement with a shoulder of the shackle the other bolt is midway between the two shoulders; a head on the shackle; and a spring, also on the shackle, the spring tending to hold the parts from rattling when the lock is applied to a tire holder.

3. The combination in a tire lock, of a casing having two bolts; a shackle arranged to pass through a tire holder and into the lock casing, said shackle having a series of shoulders arranged to be engaged by either one of the bolts; a head on the shackle; a sleeve, loose on the shackle, arranged to bear against the tire holder; and a spring between the sleeve and the head tending to prevent rattling of the parts when they are applied to a tire holder.

4. The combination in a tire lock, of a casing having a single passage therein; two bolts in the casing extending into the passage; a single stem shackle having a series of grooves therein forming abrupt shoulders on one side and inclined on the opposite side, the bolts being beveled so that the shackle can be pushed into the casing and will be locked by one of the bolts; a spring in the casing bearing against both bolts; a head on the shackle; a sleeve loose on the shackle; and a spring, also on the shackle, between the head and the sleeve tending to take up any lost motion and to prevent rattling of the parts when the parts are applied to a tire holder.

5. The combination in a tire lock of a casing having an opening therein; a single stem shackle having a head at one end and a series of shoulders at the opposite end, said shackle being arranged to pass into the opening in the casing; two bolts within the casing, arranged to engage the shoulders of the shackle and to be actuated by a single key.

6. The combination in a tire lock, of a casing having an opening therein; a headed shackle arranged to pass into the opening and having a series of shoulders thereon; and two bolts in the casing so located that, when one bolt is in engagement with a shoulder of the shackle, the other bolt is midway between two shoulders.

7. The combination in a tire lock, of a casing; a bolt therein; a single stem shackle arranged to pass into the casing and having a shoulder engaged by the bolt, said shackle having a head; a sleeve mounted on the shackle and arranged to bear against a tire holder, and a spring secured to the head and to the sleeve and arranged to clamp the lock casing yieldably to the tire holder.

JOHN L. HUSTON.